United States Patent
Konig

(10) Patent No.: US 11,621,544 B1
(45) Date of Patent: Apr. 4, 2023

(54) SPARK PLUG ELECTRODE AND METHOD OF MANUFACTURING THE SAME

(71) Applicant: FEDERAL-MOGUL IGNITION GMBH, Neuhaus-Schierschnitz (DE)

(72) Inventor: Daniel Konig, Rodental (DE)

(73) Assignee: FEDERAL-MOGUL IGNITION GMBH, Neuhaus-Schierschni (DE)

( * ) Notice: Subject to any disclaimer, the term of this patent is extended or adjusted under 35 U.S.C. 154(b) by 0 days.

(21) Appl. No.: 17/576,566

(22) Filed: Jan. 14, 2022

(51) Int. Cl.
*H01T 13/16* (2006.01)
*H01T 21/02* (2006.01)
*H01T 13/39* (2006.01)

(52) U.S. Cl.
CPC ............ *H01T 13/16* (2013.01); *H01T 13/39* (2013.01); *H01T 21/02* (2013.01)

(58) Field of Classification Search
CPC .......... H01T 13/16; H01T 13/39; H01T 21/02
See application file for complete search history.

(56) References Cited

U.S. PATENT DOCUMENTS

| | | |
|---|---|---|
| 3,119,944 A | 1/1964 | Lentz et al. |
| 5,273,474 A | 12/1993 | Oshima et al. |
| 5,347,193 A | 9/1994 | Oshima et al. |
| 5,510,667 A * | 4/1996 | Loffler ............... H01T 13/39 313/141 |
| 5,866,973 A * | 2/1999 | Kagawa ............... H01T 13/39 313/142 |
| 5,977,695 A | 11/1999 | Osamura et al. |
| 6,621,198 B2 | 9/2003 | Kanao et al. |
| 7,385,339 B2 | 6/2008 | Lineton et al. |
| 7,385,355 B2 | 6/2008 | Kusunoki et al. |
| 7,521,850 B2 | 4/2009 | Lykowski |
| 7,569,979 B2 | 8/2009 | Lykowski et al. |
| 7,795,790 B2 | 9/2010 | Lineton |
| 7,808,165 B2 | 10/2010 | Kowalski |
| 8,427,038 B2 | 4/2013 | Taido et al. |
| 8,841,828 B2 | 9/2014 | Igarashi et al. |
| 8,896,193 B2 | 11/2014 | Kataoka |
| 8,987,981 B2 | 3/2015 | Imai |
| 9,219,351 B2 | 12/2015 | Walker, Jr. |

(Continued)

FOREIGN PATENT DOCUMENTS

| | | |
|---|---|---|
| CN | 103094842 A | 5/2013 |
| CN | 103457160 A | 12/2013 |

(Continued)

OTHER PUBLICATIONS

US 10,576,577, 06/2007, Didier Le Breis (withdrawn).

*Primary Examiner* — Kevin Quarterman
(74) *Attorney, Agent, or Firm* — Reising Ethington, P.C.

(57) ABSTRACT

A spark plug electrode with an electrode tip formed on an electrode base using an additive manufacturing process, such as a powder bed fusion technique. The spark plug electrode includes an electrode base that at least partially surrounds a heat dissipating core, an electrode tip that is formed on the electrode base and includes a precious metal-based material, and a thermal coupling zone that directly thermally couples the electrode tip to the heat dissipating core. In some examples, the electrode tip is formed on an electrode base that has been cut or severed to expose a portion of the heat dissipating core, such that the electrode tip is formed directly on the heat dissipating core using additive manufacturing.

18 Claims, 4 Drawing Sheets

(56) References Cited

U.S. PATENT DOCUMENTS

| | | |
|---|---|---|
| 9,698,576 B2 | 7/2017 | Niessner et al. |
| 9,800,023 B2 | 10/2017 | Niessner et al. |
| 9,806,500 B2 | 10/2017 | Sakairi et al. |
| 9,853,423 B1 | 12/2017 | Sumoyama et al. |
| 9,871,351 B2 | 1/2018 | Thomas et al. |
| 9,948,069 B2 | 4/2018 | Segawa et al. |
| 9,991,680 B2 | 6/2018 | Ikeda et al. |
| 10,559,944 B2 | 2/2020 | Kaji et al. |
| 10,744,590 B2 | 8/2020 | Maier et al. |
| 10,897,123 B2 | 1/2021 | Abe |
| 10,913,257 B2 | 2/2021 | Coupland et al. |
| 2006/0028106 A1 | 2/2006 | Lineton |
| 2007/0132354 A1 | 6/2007 | Scott |
| 2007/0236123 A1* | 10/2007 | Lykowski ............... H01T 13/20 313/142 |
| 2013/0069516 A1* | 3/2013 | Sumoyama ............. H01T 13/39 313/141 |
| 2014/0170598 A1 | 6/2014 | Abend |
| 2017/0252854 A1 | 9/2017 | Maier et al. |
| 2018/0369919 A1 | 12/2018 | Burkhardt |
| 2019/0366585 A1 | 12/2019 | Nagai et al. |
| 2020/0256308 A1 | 8/2020 | Assaad |
| 2021/0086279 A1 | 3/2021 | Clover et al. |
| 2022/0045485 A1* | 2/2022 | Resnick .................. H01T 13/08 |

FOREIGN PATENT DOCUMENTS

| | | |
|---|---|---|
| CN | 203387050 U | 1/2014 |
| CN | 107891200 A | 4/2018 |
| CN | 107974682 A | 5/2018 |
| CN | 208299203 U | 12/2018 |
| CN | 109332694 A | 2/2019 |
| CN | 110899695 A | 3/2020 |
| DE | 102012223239 A1 | 6/2014 |
| DE | 102016209094 A1 | 11/2017 |
| DE | 112011102588 B4 | 2/2018 |
| DE | 102017221136 A1 | 5/2019 |
| DE | 102017221137 A1 | 5/2019 |
| DE | 102018212894 A1 | 2/2020 |
| DE | 102019218408 A1 | 2/2021 |
| EP | 2727898 A1 | 5/2014 |
| EP | 3035458 A1 | 6/2016 |
| FR | 3095149 A1 | 10/2020 |
| GB | 556330 A | 9/1943 |
| JP | S6355880 A | 3/1988 |
| JP | H0513145 A | 1/1993 |
| JP | H0513147 A | 1/1993 |
| JP | H0554953 A | 3/1993 |
| JP | H0567488 A | 3/1993 |
| JP | H0582235 A | 4/1993 |
| JP | H05159855 A | 6/1993 |
| JP | H05182742 A | 7/1993 |
| JP | H05242952 A | 9/1993 |
| JP | H1022054 A | 1/1998 |
| JP | H10106715 A | 4/1998 |
| JP | 3043475 B2 | 5/2000 |
| JP | 3128270 B2 | 1/2001 |
| JP | 3359347 B2 | 12/2002 |
| JP | 2002359053 A | 12/2002 |
| JP | 2005150011 A | 6/2005 |
| JP | 2006185928 A | 7/2006 |
| JP | 2009270130 A | 11/2009 |
| JP | 2013037807 A | 2/2013 |
| JP | 6598081 B2 | 10/2019 |
| JP | 2021026873 A | 2/2021 |
| KR | 100400101 B1 | 9/2003 |
| WO | 2005025783 A1 | 3/2005 |
| WO | 2006017687 A2 | 2/2006 |
| WO | 2013128416 A2 | 9/2013 |
| WO | 2015173790 A1 | 11/2015 |
| WO | WO2019025796 A1 | 2/2019 |
| WO | WO2021253061 A1 | 12/2021 |

* cited by examiner

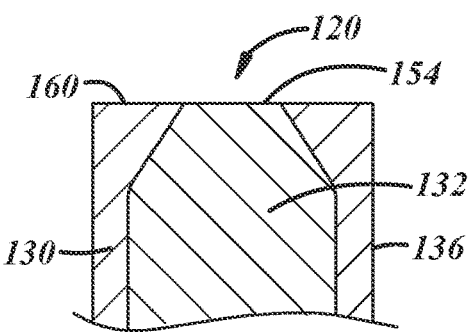
FIG. 9
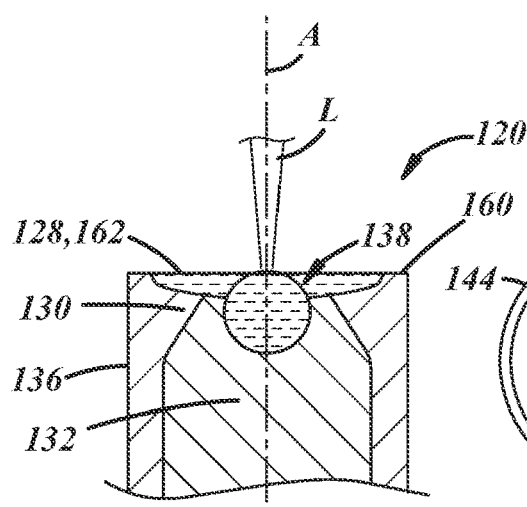
FIG. 10A    FIG. 10B
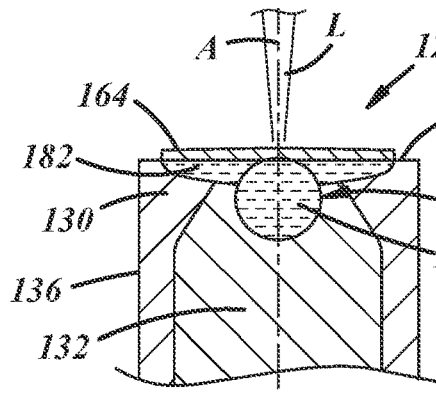 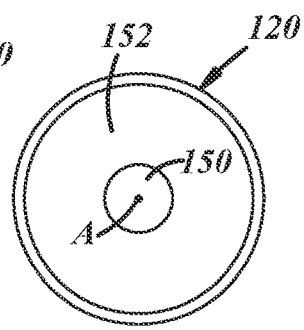
FIG. 11A    FIG. 11B
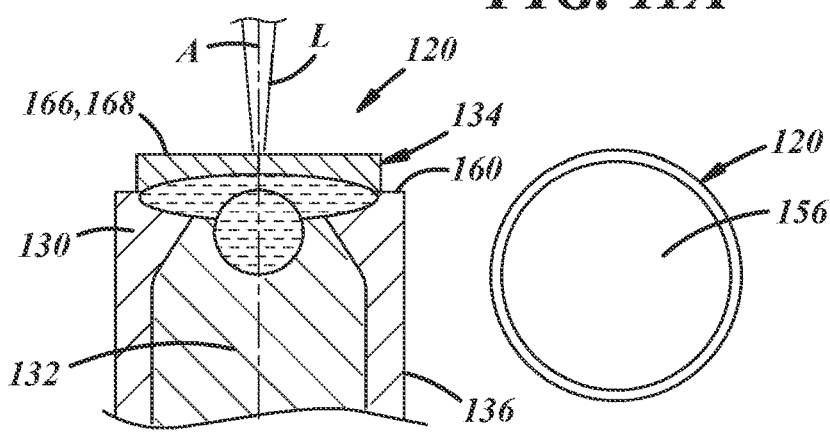
FIG. 12A    FIG. 12B

SPARK PLUG ELECTRODE AND METHOD OF MANUFACTURING THE SAME

FIELD

The present invention generally relates to spark plugs and other ignition devices and, in particular, to spark plug electrodes and other components that are made using additive manufacturing processes.

BACKGROUND

Spark plugs are used to initiate combustion in internal combustion engines. Typically, spark plugs ignite an air/fuel mixture in a combustion chamber so that a spark is produced across a spark gap between two or more electrodes. The ignition of the air/fuel mixture by means of the spark triggers a combustion reaction in the combustion chamber, which is responsible for the power stroke of the engine. The high temperatures, the high electrical voltages, the rapid repetition of combustion reactions, and the presence of corrosive materials in the combustion gases can create a harsh environment in which the spark plug must function. The harsh environment can contribute to an erosion and/or corrosion of the electrodes, which can negatively affect the performance of the spark plug over time.

To reduce erosion and/or corrosion of the electrodes, various kinds of precious metals and alloys have been used, such as those having platinum and iridium. These materials are expensive, however, particularly iridium. Consequently, the manufacturers of spark plugs try to minimize the quantity of precious metals used in an electrode. One approach involves using precious metals only on an electrode tip or on a sparking section of the electrodes, i.e. in the place where a spark jumps across the spark gap, as opposed to the entire electrode body itself.

Various joining techniques, such as circumferential laser welding, have been used for attaching a precious metal electrode tip to an electrode body. However, when a precious metal electrode tip is circumferentially laser welded to an electrode body, such as a body made from a nickel alloy, there can be a substantial amount of thermal and/or other stresses on the weld joint during operation of the spark plug due to the different properties of the materials (e.g., different coefficients of thermal expansion, different melting temperatures, etc.). In circumferential laser welding processes where the workpiece rotates and the laser remains fixed in a generally radial orientation, factors such as the concentricity and uneven wear of the workpiece holder can result in an uneven circumferential weld (e.g., the geometry and/or alloy composition of the weld can vary around the circumference of the workpiece), which can further exasperate the stresses mentioned above. These stresses, in turn, can undesirably lead to cracking or other damage to the electrode body, the electrode tip, the joint connecting the two components, or a combination thereof.

Another challenge pertains to cooling the precious metal electrode tip. If the precious metal electrode tip is not adequately cooled and a substantial amount of heat is allowed to build up, stresses like those mentioned above, can become even greater. This is particularly true in applications, such as start-stop engines, that have a high frequency of load changes coupled with high combustion temperatures in the engine. One approach to this challenge involves simply moving the thermally conductive core closer to the precious metal electrode tip and using a circumferential laser weld to attach the electrode tip to the electrode body, but this can create challenges of its own. One of which involves a change in the sparkover or sparking location of the electrode. It is preferable for the sparkover location to be on the precious metal electrode tip, as the precious metal typically provides the highest resistance to erosion and/or corrosion. However, when an electrode tip is circumferentially laser welded to an electrode base with a thermally conductive core located near the electrode tip, the welding process can draw or pull the thermally conductive core material to the outside of the electrode base in the area of the weld. This, in turn, can undesirably change or shift the sparkover location from the precious metal electrode tip surface, where it should be, to the weld surface, which is less robust in terms of resisting erosion and/or corrosion. This change in sparkover location can have a negative impact on the service life of the spark plug.

The spark plug electrode described herein is designed to address one or more of the drawbacks and challenges mentioned above.

SUMMARY

According to one embodiment, there is provided a spark plug electrode, comprising: an electrode base; a heat dissipating core that is at least partially surrounded by the electrode base; an electrode tip that is formed on the electrode base and includes a plurality of laser deposition layers; and a thermal coupling zone that is at least partially located between the electrode tip and the heat dissipating core, wherein the thermal coupling zone directly thermally couples the electrode tip to the heat dissipating core.

In accordance with various embodiments, the spark plug electrode may have any one or more of the following features, either singly or in any technically feasible combination:

wherein the heat dissipating core extends along a center axis of the spark plug electrode and terminates at an axial end that does not reach an axial end of the electrode base, an axial spacing Z between the axial end of the heat dissipating core and the axial end of the electrode base is less than or equal to 1.3 mm;

the heat dissipating core extends along a center axis of the spark plug electrode and terminates at an axial end that reaches an axial end of the electrode base, an axial spacing Z between the axial end of the heat dissipating core and the axial end of the electrode base is approximately 0.0 mm;

the heat dissipating core extends along a center axis of the spark plug electrode and terminates at an imaginary axial end that would extend beyond an axial end of the electrode base if the imaginary axial end had not been truncated, an axial spacing Z between the imaginary axial end of the heat dissipating core and the axial end of the electrode base is less than 0.0 mm;

the spark plug electrode is a center electrode and the electrode tip is a cylindrical component that is formed on an axial end of the electrode base, the electrode tip is oriented such that the plurality of laser deposition layers are perpendicular to a center axis of the spark plug electrode, and the electrode tip is secured to the electrode base with a weldless joint;

the spark plug electrode is a ground electrode and the electrode tip is a flat component that is formed on a side surface of the electrode base, the electrode tip is oriented such that the plurality of laser deposition layers are parallel to a center axis of the ground electrode in an area of the electrode tip, and the electrode tip is secured to the electrode base with a weldless joint;

the plurality of laser deposition layers are formed on the electrode base by an additive manufacturing process, which uses a powder bed fusion technique to melt or sinter precious metal-based powder onto the electrode base with a laser or electron beam, and then to allow the melted or sintered powder to solidify to become the laser deposition layers of the electrode tip, the plurality of laser deposition layers have an average layer thickness T that is between 5 μm and 60 μm, inclusive, and a total thickness of the plurality of laser deposition layers is an electrode tip height H that is between 0.05 mm and 3.0 mm, inclusive;

the electrode tip includes a precious metal-based material that has at least one precious metal selected from the group consisting of: iridium, platinum, ruthenium, palladium or rhodium;

the precious metal-based material is either a platinum-based material, a ruthenium-based material, or an iridium-based material that includes no more than 60 wt % iridium;

the electrode base includes a nickel-based material, the heat dissipating core includes a copper-based material, and the thermal coupling zone includes nickel from the nickel-based material, copper from the copper-based material and precious metal from the precious metal-based material;

the thermal coupling zone creates a thermal conduit from the electrode tip to the heat dissipating core that is in an interior of the spark plug electrode such that the thermal coupling zone is not exposed on an exterior surface of the spark plug electrode;

the thermal coupling zone, in the location between the electrode tip and the heat dissipating core, has a higher average thermal conductivity than the electrode base;

the thermal coupling zone includes a thermal coupling zone alloy with copper from the heat dissipating core, nickel from the electrode base, and at least one of iridium, ruthenium, or platinum from the electrode tip;

the thermal coupling zone includes a first portion that is located adjacent to the heat dissipating core and a second portion that is located adjacent to the electrode tip, the first portion includes a thermal coupling zone alloy having 2-45 wt % of a precious metal from the electrode tip, and the second portion includes a thermal coupling zone alloy having 2-45 wt % of copper from the heat dissipating core;

a proportion of the precious metal in the thermal coupling zone alloy decreases along a center axis from the second portion to the first portion, and a proportion of the copper in the thermal coupling zone alloy decreases along the center axis from the first portion to the second portion to create a composition gradient structure;

the thermal coupling zone includes a first portion that is located adjacent to the heat dissipating core and a second portion that is located adjacent to the electrode tip, the first portion has a bulbous shape and absorbs an axial end of the heat dissipating core, the second portion has a wide and shallow shape and fills in an area underneath the electrode tip; and the electrode tip is built on a severed end of an electrode body that has an exposed surface of the heat dissipating core so that a truncated axial end of the heat dissipating core is absorbed into the thermal coupling zone.

According to another embodiment, there is provided a spark plug electrode, comprising: an electrode base including a nickel-based material; a heat dissipating core including a copper-based material, the heat dissipating core is at least partially surrounded by the electrode base; an electrode tip including a precious metal-based material, the electrode tip is formed on the electrode base with an additive manufacturing process and includes a plurality of laser deposition layers that are perpendicular to a center axis of the spark plug electrode; and a thermal coupling zone that is at least partially located between the electrode tip and the heat dissipating core, the thermal coupling zone creates a thermal conduit from the electrode tip to the heat dissipating core that is in an interior of the spark plug electrode such that the thermal coupling zone is not exposed on an exterior surface of the spark plug electrode, and the thermal coupling zone includes nickel from the nickel-based material, copper from the copper-based material and precious metal from the precious metal-based material, wherein the thermal coupling zone directly thermally couples the electrode tip to the heat dissipating core.

According to yet another embodiment, there is provided an additive manufacturing process for manufacturing a spark plug electrode, comprising the steps of: providing an electrode body that includes an electrode base and a heat dissipating core that is at least partially surrounded by the electrode base; covering a firing end of the electrode body with a thin powder bed layer that includes a precious metal-based material; directing a laser or an electron beam at the firing end of the electrode body such that it melts or sinters at least some of the thin powder bed layer; repeating the covering and directing steps for a plurality of cycles so that an electrode tip with a plurality of laser deposition layers is formed on the electrode base and so that a thermal coupling zone is formed at least partially between the electrode tip and the heat dissipating core, wherein the thermal coupling zone directly thermally couples the electrode tip to the heat dissipating core.

In accordance with various embodiments, the additive manufacturing process may have any one or more of the following features, either singly or in any technically feasible combination:

the providing step further includes providing the electrode body with the electrode base being severed or cut through the heat dissipating core so that a portion of the heat dissipating core is exposed at an axial end;

the directing step further includes directing the laser or the electron beam at the firing end of the electrode body and driving the laser or the electron beam according to a non-uniform energy profile that concentrates more energy towards a center of the firing end and less energy towards a radially outer section of the firing end;

the non-uniform energy profile drives the laser or the electron beam with a higher energy level when it melts or sinters the thin powder bed layer in a circular zone located towards the center of the firing end, and the non-uniform energy profile drives the laser or the electron beam with a lower energy level when it melts or sinters the thin powder bed layer in an annular zone that is concentric with the circular zone and is located towards the radially outer section of the firing end; and the non-uniform energy profile helps create a customized thermal coupling zone that includes a first portion that is located deeper in the electrode body and is concentrated towards a center of the electrode body, and a second portion that is located closer to the electrode tip and is more spread out so that it is largely underneath the electrode tip.

DRAWINGS

Preferred embodiments will hereinafter be described in conjunction with the appended drawings, wherein like designations denote like elements, and wherein.

Figure 3:
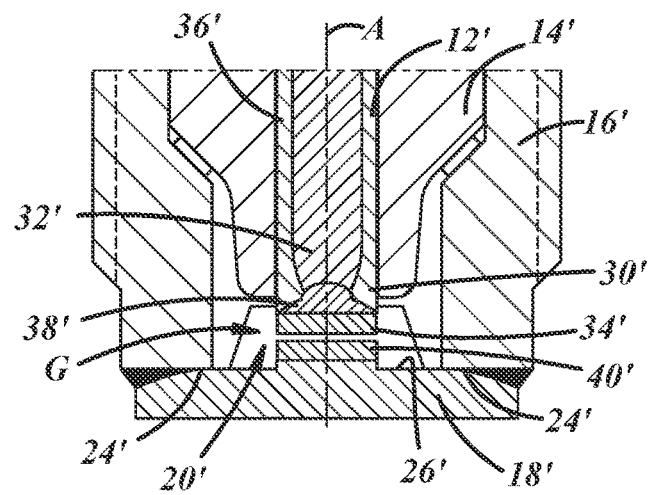
FIGS. 3-4 are cross-sectional views of other examples of firing ends of spark plugs, where the firing ends have electrode tips that are built onto electrode bases via additive manufacturing processes such that they are directly thermally coupled to heat dissipating cores.
Figure 4:
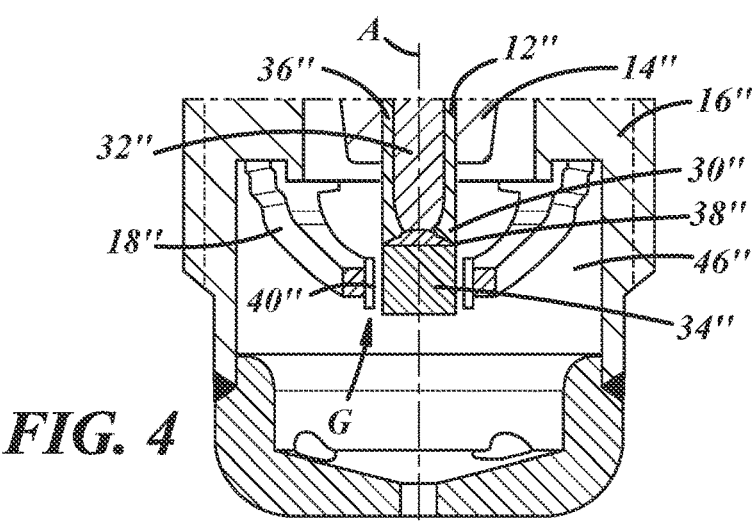
Figure 5:
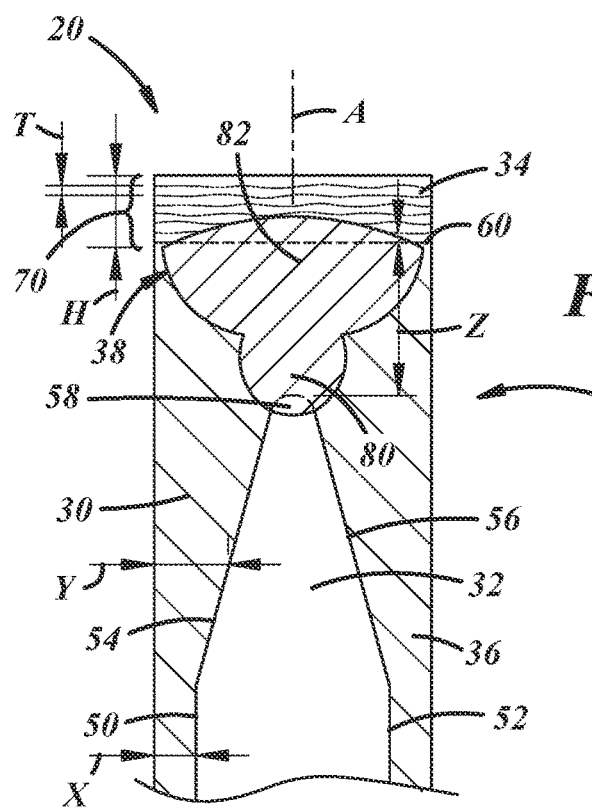
FIGS. 5-7 are cross-sectional views of electrodes that may be used with the various spark plug examples shown in FIGS. 1-4, where each of the electrodes has a precious metal-based electrode tip that is formed by additive manufacturing and is directly thermally coupled to a heat dissipating core.
Figure 6:
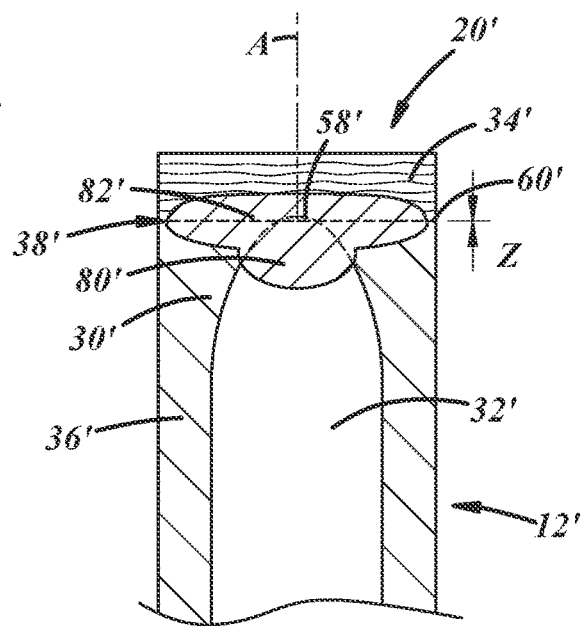
Figure 7:
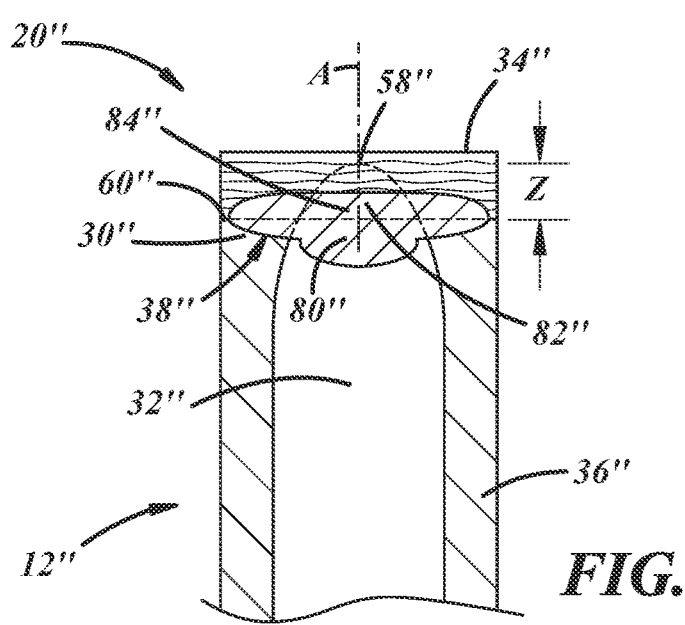
Figure 8:
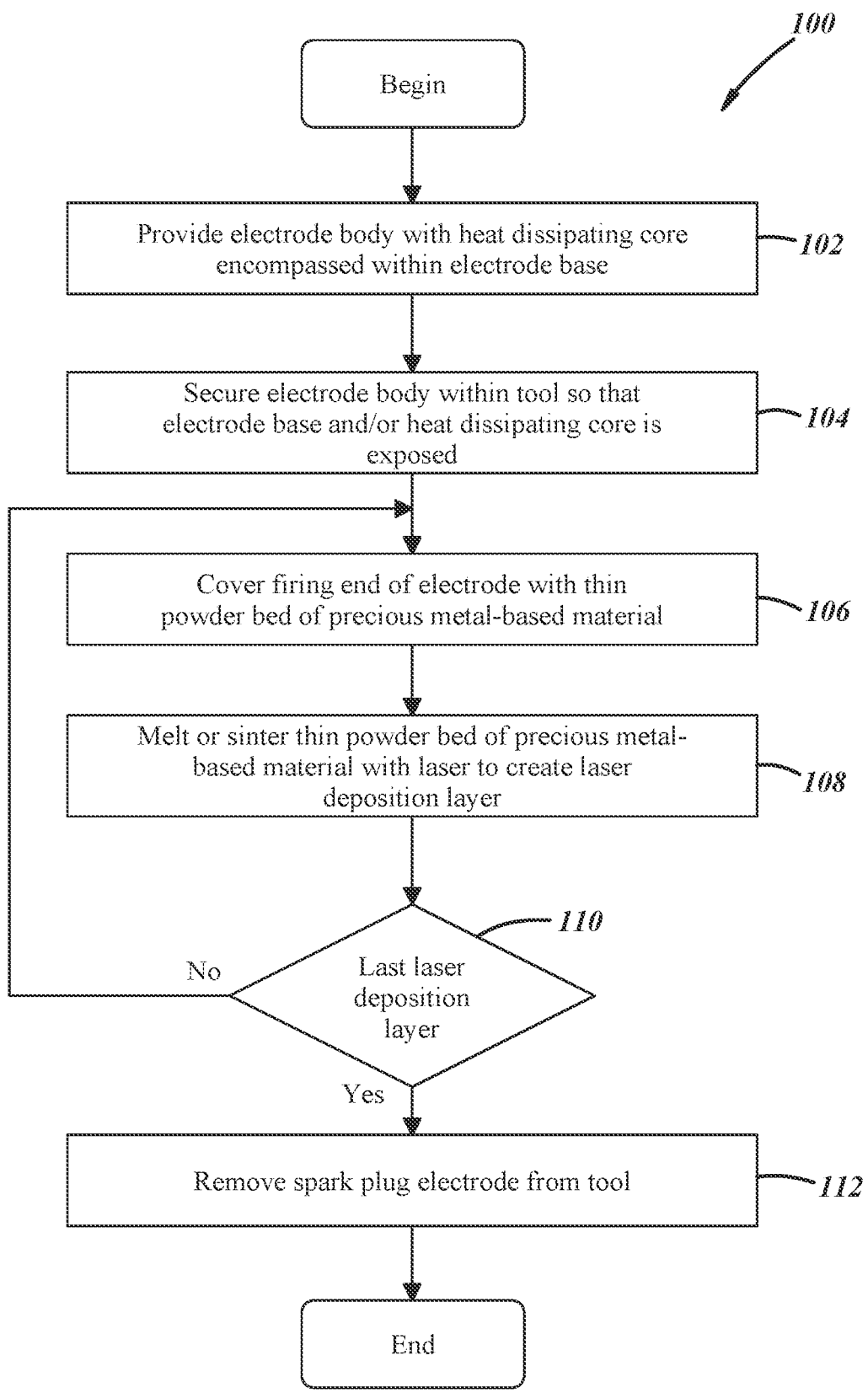

FIG. 8 is a flowchart of an additive manufacturing process that may be used with the various spark plug examples shown in FIGS. 1-4 or the electrode examples shown in FIGS. 5-7 to form a precious metal-based electrode tip that is directly thermally coupled to a heat dissipating core; and FIGS. 9, 10A, 11A and 12A are cross-sectional views and FIGS. 10B, 11B and 12B are end views of electrodes at different stages of manufacturing that coincide with the additive manufacturing process of FIG. 8.

DESCRIPTION

The spark plug electrode disclosed herein includes an electrode tip that is formed on an electrode base using an additive manufacturing process, such as a powder bed fusion technique, such that the electrode tip is directly thermally coupled to a heat dissipating core. Some non-limiting examples of potential powder bed fusion techniques that may be used include: selective laser melting (SLM), selective laser sintering (SLS), direct metal laser sintering (DMLS), and electron beam melting (EBM).

By way of example, the electrode base may be made of a nickel-based material and can surround a heat dissipating core made of a copper-based material, while the electrode tip is made of a precious metal-based material, such as one having iridium, platinum, palladium, ruthenium, rhodium, etc. The precious metal-based material is selected to improve the resistance of the spark plug electrode to corrosion and/or electrical erosion. By using an additive manufacturing process to directly build the electrode tip on the electrode base, a spark plug electrode with desirable cooling properties can be formed where the electrode tip is directly thermally coupled to the heat dissipating core. Those skilled in the art will appreciate that when a precious metal-based electrode tip is joined to a nickel-based electrode base, such as by circumferential laser welding, there is typically a substantial amount of thermal and/or other stresses on the weld joint during operation of the spark plug due to various factors (e.g., different coefficients of thermal expansion, different melting temperatures, uneven or nonuniform circumferential welds, etc.). These stresses, in turn, can undesirably lead to cracking or other damage to the electrode base, the electrode tip, the joint connecting the two components, or a combination thereof. There is also the possibility that when a circumferential laser weld is used to attach a precious metal-based electrode tip to an electrode base, the laser welding process can draw or pull the copper-based material of the heat dissipating core to the circumferential sides of the electrode. This can have the undesirable result of creating a sparkover location on the circumferential side of the electrode, away from the intended sparking surface, which in turn reduces the service life of the spark plug. These and other challenges are exacerbated in internal combustion engines, like start-stop engines, where a spark plug electrode is subjected to harsh conditions and extreme temperature and/or load changes. The spark plug electrode described herein, with an electrode tip formed by additive manufacturing so that it is directly thermally coupled to a heat dissipating core, is designed to address such challenges in an economical manner.

The spark plug electrode disclosed herein may be used in a wide variety of spark plugs and other ignition devices including industrial spark plugs, automotive spark plugs, aviation igniters, glow plugs, prechamber plugs, or any other device that is used to ignite an air/fuel mixture in an engine or other piece of machinery. This includes, but is certainly not limited to, the exemplary industrial spark plugs that are shown in the drawings and are described below. Furthermore, it should be noted that the present spark plug electrode may be used as a center and/or ground electrode. Other embodiments and applications of the spark plug electrode are also possible. Unless otherwise specified, all percentages provided herein are in terms of weight percentage (wt %) and all references to axial, radial and circumferential directions are based on the center axis A of the spark plug or spark plug electrode.

Figure 1:
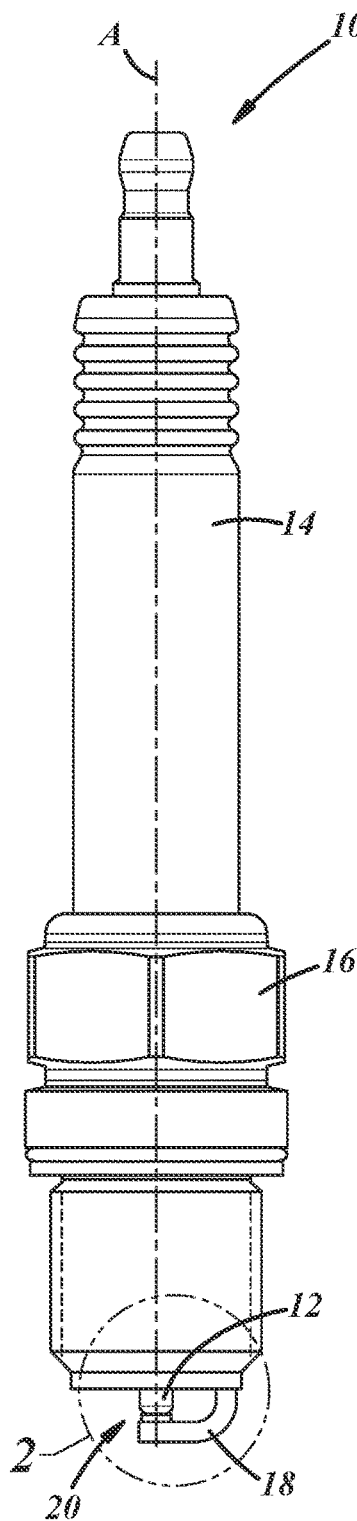
FIG. 1 is a side view of a spark plug.
Figure 2:
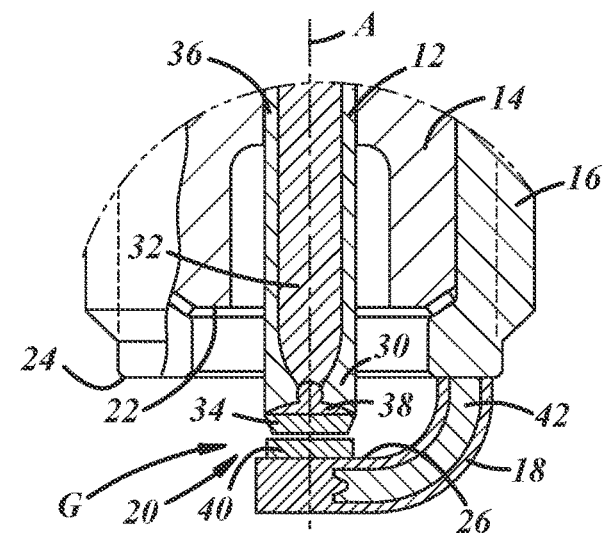
FIG. 2 is a cross-sectional view of a firing end of the spark plug in FIG. 1, where the firing end has an electrode tip that is built onto an electrode base via an additive manufacturing process such that it is directly thermally coupled to a heat dissipating core.

Referring to FIGS. 1 and 2, there is shown an exemplary spark plug 10 that includes a center electrode 12, an insulator 14, a metallic shell 16, and a ground electrode 18. The center electrode 12 is disposed within an axial bore of the insulator 14 and includes a firing end 20 that protrudes beyond a free end 22 of the insulator 14. As explained below in more detail, the firing end 20 may include an electrode base 30 made from a nickel-based material, a heat dissipating core 32 that is encompassed within the electrode base and is made from a copper-based material, and an electrode tip 34 made from a precious metal-based material, where the electrode tip is formed on the electrode base using an additive manufacturing process so that the electrode tip is directly thermally coupled to the heat dissipating core. Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may be retracted within a free end 24 of the metallic shell 16, as shown, or it may protrude beyond the metallic shell 16. The ground electrode 18 may be constructed according to the conventional J-gap configuration shown in some of the drawings or according to some other arrangement, and is attached to the free end 24 of the metallic shell 16. According to this particular embodiment, the ground electrode 18 includes a side surface 26 that opposes the firing end 20 of the center electrode and has an electrode tip or piece 40 that may or may not be formed according to the additive manufacturing process described herein, as well as a heat dissipating core 42 of its own. The electrode tip 40 is in the form of a flat pad and defines a spark gap G with the electrode tip 34 of the center electrode such that they provide sparking surfaces for the emission, reception, and exchange of electrons across the spark gap G. The electrode tips 34 and 40 may be formed from the same precious metal-based material or they may be formed from different precious metal-based materials.

In the example shown in FIGS. 1 and 2, the electrode base 30 is an extension of and is made from the same nickel-based material as a main electrode body 36. The electrode base 30 is part of the electrode body 36 and may have the same diameter (as shown), or it may be machined, drawn down, or otherwise manufactured so that it has a smaller diameter than that of the adjacent electrode body 36 and, thus, provides a pedestal or surface upon which the electrode tip 34 can be built. As will be explained more thoroughly, an additive manufacturing process may be used to form the electrode tip 34 directly on the electrode base 30 by selectively directing a laser or electron beam at a bed of precious metal-based powder that is brought into contact with an axial end of the electrode base. This causes the precious metal-based powder, as well as portions of the electrode base 30 and/or the heat dissipating core 32, to melt or intermix together and solidify at the firing end 20. The additive manufacturing process is then repeated so that the precious metal-based electrode tip 34 is built up, one layer at a time, on the electrode base 30 until it reaches its desired height. By controlling various parameters, such as a laser energy distribution and an axial spacing between an axial end of the heat dissipating core and an axial end of the electrode base, the additive manufacturing process is able to establish a direct thermal coupling or connection between the electrode tip and the heat dissipating core that can have a significant impact on the thermal management of the electrode.

As mentioned above, the present spark plug electrode is not limited to the exemplary configuration shown in FIGS. 1 and 2, as it may be employed in any number of different applications, including various industrial spark plugs, automotive spark plugs, aviation igniters, glow plugs, prechamber plugs, or other devices. The present spark plug electrode is also not limited to center electrodes, as it may be a ground or earth electrode of some type. Some non-limiting examples of other potential applications where the present spark plug electrode could be used are illustrated in FIGS. 3 and 4, where similar reference numerals as FIGS. 1 and 2 denote similar features. Numerous other embodiments and examples, such as various types of plugs with different axial, radial and/or semi-creeping spark gaps; prechamber, non-prechamber, shielded and/or non-shielded configurations; multiple center and/or ground electrodes; as well as plugs that burn or ignite gasoline, diesel, natural gas, hydrogen, propane, butane, etc. are certainly possible. The spark plug electrode and method of the present application are in no way limited to the illustrative examples shown and described herein.

In FIG. 3, the spark plug has a ground electrode 18' with a bridge-type design, as opposed to a J-gap design, that is attached to the free end 24' of the metallic shell 16' at several locations. The center electrode 12' is at least partially surrounded by an insulator 14' and includes an electrode base 30' towards its firing end 20' that has the same diameter as an adjacent electrode body 36' (this is not required, as the electrode base 30' could have a different diameter, it could be tapered, it could be stepped, etc. to cite several possibilities). Like the previous example, an electrode tip 34' is built or formed onto the electrode base 30' using an additive manufacturing process and a bed of precious metal-based powder. This process forms a thermal coupling zone 38' that may be at least partially located between a heat dissipating core 32' and the electrode tip 34' and thermally connects or links the two components in a more substantial way than if the electrode tip was simply circumferentially laser welded onto the electrode base. The drawings show the end of the heat dissipating core 32' being more rounded or blunted in shape and the thermal coupling zone 38' being flatter than their counterparts in FIG. 2. It should be appreciated that the size, shape, location, orientation and/or composition of the heat dissipating core, the thermal coupling zone and/or the electrode tip may vary depending on the specific application in which they are used and such components are not limited to the illustrative examples shown herein. An electrode tip or piece 40', which is optional and is preferably made of a precious metal-based material, can be formed by the present additive manufacturing process or it can be welded onto a side surface 26' of the bridge ground electrode 18' to define a spark gap G with the electrode tip 34'. The electrode tips 34' and 40' may be formed from the same precious metal-based material or they may be formed from different precious metal-based materials. Other embodiments are possible as well.

Turning to FIG. 4, the spark plug is a prechamber plug with a center electrode 12", an insulator 14", a metallic shell 16" and a ground electrode 18". The center electrode 12" includes an electrode base 30" with a precious metal-based electrode tip 34" formed thereon, a heat dissipating core 32" and an electrode body 36", and the center electrode extends into a prechamber space or volume 46". A radial spark gap G is formed between an outer circumferential surface of the center electrode tip 34" and an inner circumferential surface of a ring-shaped electrode piece 40" that is held in place by several ground electrodes or ground electrode holders 18". The additive manufacturing process described herein may be used to form the precious metal-based electrode tip 34" on the axial end of the electrode base 30", one layer at a time, so that the electrode tip 34" becomes directly thermally coupled to the heat dissipating core 32" via a thermal coupling zone 38". In this example, the ring-shaped electrode piece 40" is made of a precious metal-based material and is attached to the ground electrodes 18" via welding or the present additive manufacturing process. The electrode tips and pieces 34" and 40" may be formed from the same precious metal-based material or they may be formed from different precious metal-based materials.

Turning now to FIGS. 5-7, there are shown several enlarged schematic illustrations of center electrode firing ends, such as ones that could be used with the plugs in FIGS. 1-4. In each case, a center electrode 12, 12', 12" has a firing end 20, 20', 20" that includes an electrode base 30, 30', 30", a heat dissipating core 32, 32', 32", an electrode tip 34, 34', 34", and a thermal coupling zone 38, 38', 38" that acts as a thermal conduit between the electrode tip and the heat dissipating core such that the two components are directly thermally coupled to one another. Increasing the thermal communication between the electrode tip 34, 34', 34" and the heat dissipating core 32, 32, 32" enables the electrode tip to cool off more effectively during operation which, in turn, allows for a wider range of precious metal-based materials to be used in the electrode tip, including materials that are more cost effective. To explain, the electrical erosion rate and hence, the effective service life, of an electrode tip is impacted by several factors, including the melting point of the precious metal-based material. Iridium, with a melting point of about 2450° C., has a greater resistance to electrical erosion than platinum, with a melting point of about 1750° C. Electrode tips made from iridium-based materials typically display a more robust resistance to electrical erosion than those made from platinum-based materials and, thus, are sometimes more sought after. However, iridium can cost more, and in some instances, substantially more than platinum, so it may be desirable to minimize the amount of iridium and/or other high-cost materials in the production of the electrode tip. The present spark plug electrode accomplishes this by using additive manufacturing techniques to form an electrode tip 34, 34', 34" on an electrode base 30, 30', 30" such that the electrode tip is directly thermally coupled to a heat dissipating core 32, 32', 32" via a thermal coupling zone 38, 38', 38", which keeps the electrode tip cooler and enables the use of a wider array of precious metal-based materials, including less expensive materials with lower melting points. It should be appreciated that the following descriptions of the electrode base, the electrode tip, the heat dissipating core and the thermal coupling zone are not limited to the center electrodes shown in the drawings and are also applicable to other center electrode and/or ground electrode embodiments. For instance, a ground electrode having an electrode base made from a nickel-based material, an electrode tip made from a precious metal-based material, and a heat dissipating core (whether it be a single-material core or a multi-material core) made from one or more thermally conductive materials could be provided according to the present application. In such an arrangement, the electrode tip may be formed, using the present additive manufacturing techniques, on a side surface or an axial end surface of the electrode base such that the electrode tip is directly thermally coupled to the heat dissipating core, as explained. This and other center and/or ground electrode embodiments are certainly within the scope of the present application.

Electrode base 30, 30', 30" is typically the section or portion of the electrode on which the electrode tip is formed by additive manufacturing and, thus, can act as a carrier material for the electrode tip. As mentioned above, the electrode base 30, 30', 30" may be an integral extension of an electrode body 36, 36', 36" or it may be a separate piece or component that is welded, additive manufactured, or otherwise attached to the electrode body. The electrode base 30, 30', 30" can be manufactured by drawing, extruding, machining, and/or using some other conventional process and may be made from a nickel-based material. The term "nickel-based material," as used herein, means a material in which nickel is the single largest constituent of the material by weight, and it may or may not contain other constituents (e.g., a nickel-based material can be pure nickel, nickel with some impurities, or a nickel-based alloy). According to one example, the electrode base 30, 30', 30" is made from a nickel-based material having a relatively high weight percentage of nickel, such as a nickel-based material comprising 98 wt % or more nickel. In a different example, the electrode base 30, 30', 30" is made from a nickel-based material having a lower weight percentage of nickel, like a nickel-based material comprising 50-90 wt % nickel (e.g., INCONEL™ 600 or 601). One particularly suitable nickel-based material has about 70-80 wt % nickel, 10-20 wt % chromium, 5-10 wt % iron, as well as other elements in smaller quantities. For nickel-based materials, the electrode base 30, 30', 30" may have a coefficient of thermal expansion between $10 \times 10^{-6}$ m/mK and $15 \times 10^{-6}$ m/mK (measured at 100° C.), a melting temperature between 1,200° C. and 1,600° C., and a thermal conductivity between 10 W/m·K and 20 W/m·K (measured at 100° C.). The diameter or size of the electrode base 30, 30', 30" can vary substantially depending on the particular application and embodiment (e.g., the size of electrode base 30, which is part of the center electrode, is likely smaller than that of an electrode base for electrode tip 40, which is part of the ground electrode; also the size of an electrode base for an industrial plug is likely larger than that of one for an automotive plug). According to the non-limiting examples shown in FIGS. 2-4, which are industrial plugs, the electrode base may have a diameter between 1.4 mm and 4.2 mm, inclusive, and even more preferably between 1.8 mm and 3.8 mm, inclusive. For automotive and other plugs, these dimensions may be smaller and the electrode base may have a diameter between 0.7 mm and 3.0 mm, inclusive, and even more preferably between 1.0 mm and 2.5 mm, inclusive. Other materials, including those that are not nickel-based, and other sizes and shapes may be used for the electrode base 30, 30', 30" instead (e.g., the electrode base does not have to include a circular cross-section with a "diameter," but instead could include an oval, square, rectangular or other cross-section with a "dimension").

Heat dissipating core 32, 32', 32" is a section or portion of the electrode, usually an elongated portion extending along a center axis, that is at least partially encompassed or surrounded by the electrode base and is designed to convey heat or thermal energy away from the firing end. The exact size, shape and location of the heat dissipating core 32, 32', 32" can vary by application, but typically it is an elongated interior portion that extends along the center axis of the electrode and is circumferentially surrounded by the nickel-based material of the electrode base so that it is not exposed on the sides of the electrode. In the illustrated example of FIG. 5, the heat dissipating core 32 has elongated sides 50, 52 that extend in the lengthwise direction of the core, tapered sides 54, 56 that converge towards an end of the core, and an axial end 58 where the core terminates. The heat dissipating core 32 is made from one or more thermally conductive materials, such as copper- or silver-based materials, having a greater thermal conductivity than that of the surrounding electrode base 30. The thermally conductive material may have a thermal conductivity greater than 70 W/m·K (measured at 100° C.) and, even more preferably, a thermal conductivity greater than 200 W/m·K (measured at 100° C.). The term "copper-based material," as used herein, means a material in which copper is the single largest constituent of the material by weight, and it may or may not contain other constituents (e.g., a copper-based material can be pure copper, copper with some impurities, or a copper-based alloy). According to one example, the heat dissipating core 32, 32', 32" is made from a thermally conductive material that is a copper-based material having a relatively high weight percentage of copper, such as a copper-based material comprising 90 wt % or more copper. For copper-based materials, the heat dissipating core 32, 32', 32" may have a coefficient of thermal expansion between $14 \times 10^{-6}$ m/mK and $19 \times 10^{-6}$ m/mK (measured at 100° C.), a melting temperature between 950° C. and 1,200° C., and a thermal conductivity greater than 275 W/m·K (measured at 100° C.).

The elongated sides 50, 52 are generally parallel to one another and the center axis A and help form the outer boundary of the heat dissipating core 32. As mentioned above, it is typically undesirable for the heat dissipating core material, which is much less resistant to corrosion and/or erosion than the precious metal-based material and is highly conductive, to be exposed on the outer surface of the electrode where it can become an unintended sparkover location. Thus, it is preferable that the heat dissipating core 32, in the area of the elongated sides 50, 52, be covered with a sheath or casing of the electrode base 30 having a radial thickness X on each side that is greater than or equal to 0.2 mm.

The heat dissipating core 32 typically does not terminate in a perfectly squared off form, but rather gradually narrows or tapers towards the axial end 58. This can be due to design factors or to the manufacturing process, such as when the heat dissipating core is initially inserted into an electrode base cup and is then co-extruded or co-drawn with the electrode base. In some examples, the tapered sides 54, 56 are generally straight, angled segments that gradually converge towards one another (e.g., as shown in FIG. 2), but it is also possible for the tapered sides to be rounded (e.g., as shown in FIG. 3) or even more squared off (e.g., as shown in FIG. 4). It is preferable, although not required, that a radial thickness Y of the electrode base material 30 in the area of the tapered sides 54, 56 (as measured approximately halfway between the axial beginning and axial end of a tapered side) be greater than or equal to 0.3 mm, but such a dimension depends greatly on the shape of the heat dissipating core 32 in this area.

The axial end 58 of the core can have any number of different shapes and configurations, including ones that are pointed, rounded, blunted, squared-off, etc. The location of the axial end 58 dictates an axial spacing Z, which is the axial distance between the axial end 58 of the core and the axial end 60 of the electrode base, not counting the electrode tip 34. Axial spacing Z can have a significant impact on the thermal coupling between the electrode tip 34 and the heat dissipating core 32 and can affect both the operation of the spark plug, as well as its manufacture. In a non-limiting example, the axial spacing Z is less than or equal to 1.3 mm, even more preferably is less than or equal to 1.05 mm, even more preferably is less than or equal to 0.8 mm, and even more preferably is less than or equal to 0.55 mm. In some examples, it is even possible for the axial end 58 of the heat dissipating core 32 to be at the same axial position as the axial end 60 of the electrode base 30 (e.g., see FIG. 6) so that the axial spacing Z is essentially 0 mm, or for the axial end 58 of the heat dissipating core to be cut off (e.g., see FIG. 7) so that the axial spacing Z is a negative dimension. Testing has revealed, however, that simply decreasing and/or increasing the axial spacing Z, if not adequately offset with other precautions, can present challenges of its own. For instance, if the axial spacing Z is too small in some conventional plugs, then it can be difficult to produce reliable circumferential laser welds, as the close proximity of a heat dissipating core causes it to pull substantial amounts of heat away from the welding area which, in turn, can impact the quality of the weld. If, on the other hand, the axial spacing Z is too large in certain conventional plugs, then there is insufficient thermal coupling between an electrode tip and a heat dissipating core, as the interposed nickel-based material with its lower thermal conductivity can act as a thermal barrier of sorts between the components. The present spark plug electrode overcomes these and other challenges by using an additive manufacturing process to form the electrode tip 34 on the electrode base 30 such that they are directly thermally coupled to one another via the thermal coupling zone 38.

Although the heat dissipating core 32, 32', 32" is shown in the drawings as a single-material core (i.e., a core formed from a single thermally conductive material, which may or may not include multiple constituents), it is also possible for it to be a multi-material core. According to a first example of a multi-material core, an inner heat dissipating core component (e.g., one made from a nickel-based material) extends along a portion of the electrode, and an outer heat dissipating core component (e.g., one made from a copper-based material) extends along the same portion of the electrode such that it at least partially surrounds and is concentric with the inner heat dissipating core component. In this concentric or layered arrangement, it is possible for the inner heat dissipating core component to extend or protrude beyond the end of the outer heat dissipating core component. According to a second example of a multi-material core, a forward heat dissipating core component extends along a portion of the electrode that is closer to a firing end, and a rearward heat dissipating core component extends along a portion of the electrode that is further from the firing end. In this end-to-end or serial arrangement, one of the heat dissipating core components may be longer than the other. The first and/or second multi-material core examples may be used with a center electrode and/or a ground electrode. If a multi-material core is used, the axial spacing Z is measured from the axial end of the closest heat dissipating core component to the electrode tip (i.e., the shortest axial spacing Z). Of course, numerous other heat dissipating core arrangements and configurations are possible and are certainly within the scope of the present application.

Electrode tip 34, 34', 34" is the section or portion of the electrode, usually the sparking portion, that is typically formed on the electrode base by additive manufacturing. As such, the electrode tip 34, 34', 34" may be made from a bed of precious metal-based powder that is brought into close proximity with the electrode base so that, when irradiated by a laser or electron beam, the precious metal-based powder and some of the solid material of the electrode base 30 and/or the heat dissipating core 32 are melted and solidify into laser deposition layers. This process of creating individual layers is repeated, thereby creating a number of laser deposition layers 70 that are sequentially built or stacked on one another such that the layers are perpendicular to the center axis A of the electrode (being "perpendicular" in this context does not require perfect perpendicularity, so long as layers 70 are, when viewed in cross-section, perpendicular to center axis A within a tolerable margin of error). Some of the laser deposition layers 70 may have materials from the heat dissipating core 32, the electrode base 30 and the electrode tip 34; some layers 70 may only have material from the electrode base 30 and the electrode tip 34; while other layers 70 may only have material from the electrode tip 34. Each laser deposition layer has an average layer thickness T, which may be between 5 μm and 60 μm, and the total or sum of all of the layer thicknesses is the electrode tip height H, which may be between 0.05 and 3.0 mm, or even more preferably between 0.1 and 1.5 mm. The electrode tip 34, 34', 34" may be produced according to embodiments that: are diametrically reduced with respect to an electrode base, as well as those that are not; are in the shape of rivets, cylinders, bars, columns, wires, balls, mounds, cones, flat pads, disks, plates, rings, sleeves, etc.; are circular, oval, square, rectangular and/or other shaped, in terms of its cross-section; are located at an axial end of an electrode base, as well as those that are located on a side surface or other part of the electrode base; and are part of a center electrode or a ground electrode, to cited a few possibilities.

The electrode tip 34, 34', 34" may be made from a precious metal-based material so as to provide improved resistance to corrosion and/or erosion. The term "precious metal-based material," as used herein, means a material in which a precious metal is the single largest constituent of the material by weight, and it may or may not contain other constituents (e.g., a precious metal-based material can be pure precious metal, precious metal with some impurities, or a precious metal-based alloy). Precious metal-based materials that may be used include iridium-, platinum-, ruthenium- palladium- and/or rhodium-based materials, to cite a few possibilities. According to one example, the electrode tip 34, 34', 34" is made from an iridium-, platinum- or ruthenium-based material, where the material has been processed into a powder form so that it can be used in the additive manufacturing process. For iridium-based materials, the electrode tip may have a coefficient of thermal expansion between $6\times10^{-6}$ m/mK and $7\times10^{-6}$ m/mK (measured at 100° C.), a melting temperature between 2,300° C. and 2,500° C., and a thermal conductivity between 120 W/m·K and 180 W/mK (measured at 100° C.); for platinum-based materials, the electrode tip may have a coefficient of thermal expansion of between $8\times10^{-6}$ m/mK and $10\times10^{-6}$ m/mK (measured at 100° C.), a melting temperature between 1,650° C. and 1,850° C., and a thermal conductivity between 50 W/mK and 90 W/mK (measured at 100° C.). As mentioned above, certain precious metals, like iridium, can be very expensive, thus, it is typically desirable to reduce the content of such materials in the electrode tip, so long as doing so does not unacceptably degrade the performance of the electrode tip. Precious metal-based powders with no more than 60 wt % iridium (e.g., Pt—Ir40, Pt—Ir50, Ir—Pt40, Ru—Rh5, etc.), and preferably with no more than 50 wt % iridium (e.g., Pt—Ir40, Pt—Ir50, Ru—Rh5, etc.), can be used to make the electrode tip 34, 34', 34" when the tip is directly thermally coupled to the heat dissipating core 32, 32', 32", as such materials can strike a desirable balance between cost and performance. However, other precious-metal based powders, such as those with up to about 98 wt % iridium (e.g., Ir—Rh2.5, Ir—Rh5, Ir—Rh10, Ir—Pt5, Ir-Pt5-Rh5), etc.), may be used as well, particularly if the prices of such materials come down in the future. The diameter or size of the electrode tip 34, 34', 34" varies depending on the particular application and embodiment. For instance, in the non-limiting examples shown in FIGS. 2-4, which are industrial plugs, each of the electrode tips may have a diameter between 1.0 mm and 4.2 mm, inclusive, and even more preferably between 1.2 mm and 3.0 mm, inclusive. For automotive and other plugs, these dimensions will likely be smaller and the electrode tip may have a diameter between 0.4 mm and 3.0 mm, inclusive, and even more preferably between 0.6 mm and 2.0 mm, inclusive. The electrode tip does not have to include a circular cross-section with a "diameter," but instead could include an oval, square, rectangular or other cross-section with a "dimension."

Thermal coupling zone 38, 38', 38" is located at least partially between the heat dissipating core and the electrode tip and includes material from the heat dissipating core, the electrode base and/or the electrode tip. The thermal coupling zone 38, 38', 38" is designed to act as a thermal conduit or channel so that heat that builds up during operation of the spark plug can be effectively conveyed or transferred away from the electrode tip 34, 34', 34" to the heat dissipating core 32, 32', 32", from which point it can further dissipate into the insulator 14, the shell 16 and eventually the cylinder head of the engine. As explained above, increased cooling of the electrode tip 34, 34', 34" is desirable for a number of reasons: it reduces the thermal stresses that arise at the junction between the electrode tip and electrode base; it decreases the rate of erosion and/or corrosion of the electrode tip; and it enables the use of a wider variety of precious metal-based materials, including less expensive materials with lower melting points, as well as less precious metal material, to name but a few. The thermal coupling zone 38, 38', 38" is located in the interior of the electrode so that its concentrated towards the center or middle of the electrode, and it may include material from the heat dissipating core 32, 32', 32", the electrode base 30, 30', 30" and/or the electrode tip 34, 34', 34" (when they are all present in the thermal coupling zone, these materials together make a thermal coupling zone alloy). By containing the thermal coupling zone 38, 38', 38" in the middle of the electrode, it prevents it from being exposed on an exterior and becoming an unwanted sparkover location. Furthermore, the thermal coupling zone alloy has a higher average thermal conductivity than that of the electrode base 30, 30', 30" by itself, which can sometimes act like a thermal barrier or impediment in plugs where a substantial amount of electrode base material is interposed between the tip and core. The combination of the thermal coupling zone alloy (e.g., Ni—Ir—Cu, Ni—Pt—Cu, Ni—Ir—Pt—Cu, etc.), the close proximately between the electrode tip and the heat dissipating core (e.g., less than 2.0 mm), and the concentrated shape of the thermal coupling zone (e.g., a somewhat elongated shape along the center axis A of the electrode) helps create a direct thermal coupling or connection between the electrode tip and the heat dissipating core, without undesirably creating an unwanted sparkover point on the side of the electrode. The thermal coupling zone 38, 38', 38" also helps reduce stresses, such as those caused by different rates of thermal expansion, at the junction between the electrode tip and base. The following paragraphs describe different examples of thermal coupling zones and are provided in conjunction with FIGS. 5-7. It should be appreciated that these drawings are only schematic illustrations, as the heat dissipating cores, the thermal coupling zones, the electrode bases, the electrode tips, etc. may appear differently than those illustrated.

In FIG. 5, there is shown an example of a thermal coupling zone 38 that may be used with the spark plug of FIG. 2. Since the axial end 58 of the heat dissipating core 32 does not reach the axial end 60 of the electrode base 30, the electrode 12 has an axial spacing Z that is approximately 0.5 mm. The distribution or concentration of materials in the thermal coupling zone 38 may vary along the center axis A, but elements from the heat dissipating core 32, the electrode base 30, and the electrode tip 34 are all present in the thermal coupling zone 38. Preliminary tests suggest that in a first portion 80 of the thermal coupling zone 38, which is adjacent the heat dissipating core 32 and is furthest from the electrode tip 34, the thermal coupling zone may include a thermal coupling zone alloy having approximately: 2-45 wt % of a precious metal (e.g., Ir, Pt, Pd, Ru, Rh, etc.), 2-50 wt % of copper, 20-75 wt % of nickel, and the remainder being other elements from the electrode components. In a second portion 82 of the thermal coupling zone that is adjacent the electrode tip 34 and is furthest from heat dissipating core 32, the thermal coupling zone may include a thermal coupling zone alloy having approximately: 10-65 wt % of a precious metal (e.g., Ir, Pt, Pd, Ru, Rh, etc.), 2-45 wt % of copper, 10-65 wt % of nickel, and the remainder being other elements from the electrode components. Even though the exact composition of the thermal coupling zone 38 may vary from the examples provided above, it is preferable that a thermal coupling zone alloy include thermally conductive material from the heat dissipating core 32, nickel from the electrode base 30, and precious metal from the electrode tip 34 and that the thermal coupling zone be configured according to a gradient structure so that the first portion 80 has a greater amount of copper than the second portion 82, and that the second portion 82 has a greater amount of precious metal than the first portion 80.

FIG. 6 shows another possible example of a thermal coupling zone 38' which may be used with the spark plug of FIG. 3. In this example, the axial end 58' of the heat dissipating core 32' reaches the axial end 60' of the electrode base 30' so that electrode 12' has an axial spacing Z that is approximately 0.0 mm. As illustrated, the electrode body 36' has been cut or severed such that axial end 58' of the heat dissipating core 32' is at or is nearly at the axial end 60' of the electrode base 30' (hence the axial spacing Z of approximately 0.0 mm). When the additive manufacturing process begins building the initial layers of the electrode tip 34', a laser or electron beam is directed in the axial direction such that it melts a thin coating of precious metal-based powder covering the axial end 60', as well as melting some of the underlying electrode base 30' and the heat dissipating core 32'. Due to the precise nature of additive manufacturing processes, such as those using powder bed fusion techniques, a disproportional amount of energy can be concentrated or directed towards the center of the electrode, which in turn can start to create a deeper thermal coupling zone 38' in this area. This process may continue, layer by layer with its energy concentration towards the center or middle of the axial end 60', so that the thermal coupling zone 38' becomes deeper towards the middle of the electrode. It is possible, although not required, that the thermal coupling zone 38' could become somewhat spherical or bulbous in shape towards the middle; this is illustrated in FIG. 6, where the axial end 58' of the heat dissipating core 32' has been at least partially absorbed into the bulbous-shaped first portion 80' of the thermal coupling zone 38'. A second portion 82' of the thermal coupling zone 38' may be wider and shallower in shape so that it fills in a majority of the area underneath the electrode tip 34', but does not extend as deep into the electrode as the first portion 80'. The thermal coupling zone 38' may have a composition and/or gradient structure similar to that described above in connection with the previous example In FIG. 7, there is illustrated another example of a thermal coupling zone 38" which may be used with the spark plug in FIG. 4. In this example, before the electrode tip 34" was added, the electrode body 36" was severed at position that cut through the heat dissipating core 32" (i.e., the axial end of the heat dissipating core was cut off to expose a surface of the core). Thus, the axial spacing Z between an imaginary axial end 58" (where it would have been if it had not been cut off, as indicated in broken lines) and an axial end 60" of the electrode base 30" is a negative dimension, such as between 0.0 mm and −0.5 mm. Due to the close axial proximately between the bulk of the heat dissipating core 32" and the electrode tip 34", this example will likely exhibit high thermal conductivity such that the electrode tip can be effectively cooled down during operation. As mentioned earlier, special care has to be taken to ensure that the copper-based material from the heat dissipating core 32" is not drawn or pulled to an exterior side surface of the electrode, as that could create an unwanted sparking site at that location. In a first portion 80" of the thermal coupling zone, a truncated axial end 84" of the heat dissipating core 32" has been absorbed into the thermal coupling zone. Portions of the truncated axial end 84" may also be absorbed and intermixed with other materials in a second portion 82" as well. In this example, the electrode tip 34" is built on the severed end of the electrode body 36" such that precious metal-based powder is directly melted into exposed portions of the electrode base 30" and exposed portions of the heat dissipating core 32". This is possible with the additive manufacturing process described herein, which creates a weldless joint between the electrode tip 34" and the electrode body 36", but does not form a circumferential laser weld.

Turning now to FIG. 8, there is a flowchart showing the steps of an additive manufacturing process 100 (sometimes referred to as a 3D printing process) that may be used to create the spark plug electrode described herein. According to this example, additive manufacturing process 100 uses a powder bed fusion technique to form the electrode tip 134 on the electrode base 130, as illustrated in the progressive steps shown in FIGS. 9-12. It should be appreciated, however, that additive manufacturing process 100 may be used with any of the electrodes taught herein, as well as others, and is certainly not limited to the illustrated example.

Starting with step 102, an electrode body 136 is provided with a heat dissipating core 132 at least partially surrounded by or encapsulated within an electrode base 130. As explained in connection with FIGS. 5-7, an electrode body may be provided with one of a number of different configurations, including: those where the heat dissipating core is retracted within the electrode base so that it does not reach an axial end of the electrode base (e.g., see FIG. 5); those where the heat dissipating core terminates at or near the axial end of the electrode base (e.g., see FIG. 6); or those where the electrode body has been severed or cut through the electrode base and the heat dissipating core such that an imaginary axial end of the core extends beyond the axial end of the electrode base and leaves a portion of the core exposed (e.g., see FIG. 7), to site a few possibilities. This last possibility is further illustrated in FIG. 9, where a truncated axial end 154 of the heat dissipating core 132 is exposed and is generally flush with an axial end 160 of the electrode base 130. It should be appreciated that any suitable method for cutting, severing or terminating the electrode body may be used, including mechanical cutting or shearing, abrasive cutting, water jet or laser cutting, or some other suitable method for removing the end of the electrode body.

Next, the electrode body 136 is secured within a tool or jig such that the electrode base 130 and/or the heat dissipating core 132 are exposed at a firing end 120, step 104. It is preferable that the electrode body 136 be secured or mounted vertically within the tool such that the firing end 120 is facing upwards. Any number of different tools and fixturing arrangements may be used for this purpose, including those having horizontal build plates that are flush or nearly flush with the axial end 160 and are designed to receive a thin powder bed.

Once secured within the tool, the firing end 120, with the exposed electrode base and/or heat dissipating core portions, is covered with a thin powder bed layer 128 that includes a first mixture of precious metal-based material, step 106. The first mixture may include precious metal-based material with no more than 60 wt % iridium (e.g., Pt—Ir40, Pt—Ir50, Ir—Pt40, Ru—Rh5, etc.), and preferably with no more than 50 wt % iridium (e.g., Pt—Ir40, Pt—Ir50, Ru—Rh5, etc.), although this is not required. In one example, the powder bed layer 128 has a thickness of between 5 μm and 60 μm, inclusive, and more preferably a thickness that is between 10 μm and 20 μm, inclusive.

Next, a laser or electron beam is used to melt or at least sinter the thin powder bed layer 128 covering the firing end 120, step 108. Any references herein to "lasers" should be understood to broadly include any suitable light or energy source including, but not limited to, electron beams and lasers; the same applies to "laser deposition layers," which broadly includes deposition layers created by any suitable light or energy source including, but not limited to, those created by electron beams and lasers. As illustrated in FIG. 10A, a laser L is generally aligned with the center axis A of the electrode and is directed towards the firing end 120 (which, in this example, includes exposed portion 160 of the electrode base 130 and exposed portion 154 of the heat dissipating core 132) such that it melts or sinters a thin powder bed layer 128 as the laser traverses or moves across the axial end surface of the firing end; this is part of the powder bed fusion process. This forms an initial laser deposition layer 162 and begins to form different portions of a thermal coupling zone 138, which will establish a direct thermal connection between an electrode tip 134 and a heat dissipating core 132 when the additive manufacturing process is complete.

According to one example, step 108 does not use a constant or uniform energy level for the laser when melting the thin powder bed layer, rather it selectively controls the energy level according to a non-uniform energy profile so that more energy is concentrated towards the center of the firing end 120. FIG. 10B is an end or top view of the firing end 120, with the different circular or annular zones representing different laser energy levels of the non-uniform energy profile. For instance, zone 140 is a circular zone that encompasses center axis A and is located at the middle of the firing end. In zone 140, the laser energy is the highest level used during the non-uniform energy profile and can be between 90% and 100% of a maximum or predetermined energy level. Zone 142 is an annular zone that concentrically surrounds zone 140 and, according to this example, applies a laser energy level that is slightly lower than that applied in zone 140, such as between 75% and 90% of the maximum or predetermined energy level. Zone 144 is also an annular zone and it concentrically surrounds zones 140, 142 so that it is located towards a radially outer section of the firing end 120. For zone 144, a laser energy level of less than 75% of the maximum or predetermined energy level may be used; the lower energy level reduces the chances of drawing too much copper- and/or nickel-based material towards the sides of the electrode. Furthermore, by concentrating more laser energy towards the center of the firing end 120, the non-uniform energy profile is able to melt more material in the middle of the electrode body, including copper-based material from the heat dissipating core 132, nickel-based material from the electrode base 130, and precious metal-based material from the thin powder bed layer 128. This deeper penetration in the middle of the electrode body helps build the shape of the thermal coupling zone 138 without drawing copper-based materials to the sides of the electrode where they could become unwanted sparking locations, as can be the case with circumferential laser welds.

It is possible for the method to vary the laser energy distribution every pass or every so many passes in order to control or at least influence the size, shape and/or composition of the thermal coupling zone 138. With reference to FIGS. 11A-11B, there are respectively shown a sectional view of the electrode body 136, and a top view of the firing end 120 with different circular or annular zones representing different laser energy levels. Again, the non-uniform energy profile may concentrate laser energy towards the center of the firing end 120 so that the thermal coupling zone 138 reaches deeper and deeper into the heat dissipating core 132 each time a new laser deposition layer 164 is added. For instance, the non-uniform energy profile may include zone 150, which is a circular zone that encompasses center axis A at the middle of the firing end 120, and can have a laser energy level between 80% and 90% of a maximum or predetermined level. Zone 152, which is a concentric annular zone encompassing the remainder of the axial end 160, may have a laser energy level of approximately 80% of a maximum or predetermined level. During the repeat cycling of steps 106-108, the method not only builds up the electrode tip 134 with a number of stacked laser deposition layers, it may also vary or modulate the laser energy across the firing end 120 according to the non-uniform energy profile in order to create a customized thermal coupling zone 138 with first and second portions 180, 182. The first portion 180 is located deeper in the electrode body 136 (i.e., further from the axial end 160) and is more concentrated towards the center of the electrode body, whereas the second portion 182 is located closer to the firing end 120 and is more spread out so that it is largely underneath the electrode tip 134. The first portion 180 helps form the main thermal channel or conduit between the electrode tip 134 and the heat dissipating core 132. It should be appreciated that the depictions of the first and second portions 180, 182 are for purposes of illustration and that the actual portions may have different shapes and sizes than those shown.

On a last pass through, the method forms a final laser deposition layer 166, which constitutes at least part of a sparking surface of the electrode tip 134. When forming the final laser deposition layer(s) 166, the method may use a uniform energy profile or distribution, instead of a non-uniform energy profile, in order to help smooth out or provide a more uniform sparking surface, as illustrated in FIGS. 12A-B. In this example, a single circular zone 156 may be used across the entire firing end 120 so that the final laser deposition layer(s) 166 is formed at a constant laser energy level (e.g., a level of about 80% of a maximum energy level). By using a constant laser energy level for the last cycle or several cycles of the method, an electrode tip 134 with a flatter sparking surface 168 can be formed. Of course, the preceding description is only one example of an additive manufacturing process that may be used, as other such processes are certainly possible. Specific parameters, such as the size, shape, number and energy level of the different laser energy zones, may vary from the non-limiting examples provided herein.

The cycle or sequence of steps 106-108 is repeated until the method determines that no more laser deposition layers are needed (i.e., the electrode tip 134 has achieved the desired height). If step 110 determines that more laser deposition layers are needed, then the method loops back and repeats steps 106 and 108 so that a new laser deposition layer can be built on top of the previous layer(s). It should be appreciated that on an initial pass or cycle through steps 106-108, step 106 may cover the axial end 160 and truncated axial end 154 with a thin powder bed 128 (i.e., the precious metal-based material of the thin powder bed may be in direct contact with the nickel-based material of axial end 160 and the copper-based material of truncated axial end 154) and step 108 may melt or sinter the thin powder bed directly into ends 160 and/or 154. In subsequent passes or cycles through steps 106-108, after the initial laser deposition layer 162 has already been formed, step 106 may apply the thin powder bed 128 so that it covers one or more previously created laser deposition layer(s) 162, as opposed to covering the actual surfaces of ends 160 and/or 154. In this example, step 108 melts or sinters the thin powder bed material into the previously created laser deposition layer(s), as well as possibly into the electrode itself (depending on how thick the previously created laser deposition layer(s) are and how deep the melting or sintering step goes). In both instances (i.e., in the initial pass and in subsequent passes of steps 106-108), step 106 covers the firing end 120 with a thin powder bed and step 108 melts or sinters the thin powder bed into the firing end 120.

Since each laser deposition layer is formed first by melting or sintering powder from the thin powder bed and then allowing the material to solidify, it is possible to adjust or modify the composition of the different laser deposition layers by changing the composition of the powder bed along the way. This enables the present electrode to have a tailored or customized composition gradient across the thermal coupling zone 138 and/or the electrode tip 134 that spreads out differences in thermal coefficients of expansion, as opposed to having the full difference of those coefficients experienced at a single inter-layer boundary. For instance, on the second or a later pass through the method, step 106 may cover the firing end 120 with a second mixture of precious metal-based material having a different composition than the first mixture (e.g., the second mixture may have a greater proportion of precious metal-based material), although this is not required.

Once step 110 determines that no additional laser deposition layers are needed (i.e., the electrode tip 134 is fully formed by additive manufacturing, the method progresses to step 112, where the spark plug electrode or workpiece is removed from the tool. Skilled artisans will appreciate that the additive manufacturing process just described may be used to manufacture large numbers of electrodes at a time (i.e., batch processing), as well as various types of electrodes that differ from those shown here. One difference between the spark plug electrode produced according to the aforementioned process is that the electrode tip is securely fastened to the electrode base without the use of a circumferential laser weld (i.e., the present electrode has a weldless joint between the electrode tip and base), which is advantageous for a number of reasons, including those described above.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the exact size, shape, composition, etc. of a thermal coupling zone covered could vary from the disclosed examples and still be covered by the present application (e.g., micrographs of actual parts could appear substantially different from the illustrated drawings, yet still be covered). All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A spark plug electrode, comprising:
an electrode base;
a heat dissipating core that is at least partially surrounded by the electrode base;
an electrode tip that is formed on the electrode base and includes a plurality of laser deposition layers; and
a thermal coupling zone that is at least partially located between the electrode tip and the heat dissipating core, wherein the thermal coupling zone directly thermally couples the electrode tip to the heat dissipating core.

2. The spark plug electrode of claim 1, wherein the heat dissipating core extends along a center axis of the spark plug electrode and terminates at an axial end that does not reach an axial end of the electrode base, an axial spacing Z between the axial end of the heat dissipating core and the axial end of the electrode base is less than or equal to 1.3 mm.

3. The spark plug electrode of claim 1, wherein the heat dissipating core extends along a center axis of the spark plug electrode and terminates at an axial end that reaches an axial end of the electrode base, an axial spacing Z between the axial end of the heat dissipating core and the axial end of the electrode base is approximately 0.0 mm.

4. The spark plug electrode of claim 1, wherein the heat dissipating core extends along a center axis of the spark plug electrode and terminates at an imaginary axial end that would extend beyond an axial end of the electrode base if the imaginary axial end had not been truncated, an axial spacing Z between the imaginary axial end of the heat dissipating core and the axial end of the electrode base is less than 0.0 mm.

5. The spark plug electrode of claim 1, wherein the spark plug electrode is a center electrode and the electrode tip is a cylindrical component that is formed on an axial end of the electrode base, the electrode tip is oriented such that the plurality of laser deposition layers are perpendicular to a center axis of the spark plug electrode, and the electrode tip is secured to the electrode base with a weldless joint.

6. The spark plug electrode of claim 1, wherein the spark plug electrode is a ground electrode and the electrode tip is a flat component that is formed on a side surface of the electrode base, the electrode tip is oriented such that the plurality of laser deposition layers are parallel to a center axis of the ground electrode in an area of the electrode tip, and the electrode tip is secured to the electrode base with a weldless joint.

7. The spark plug electrode of claim 1, wherein the plurality of laser deposition layers are formed on the electrode base by an additive manufacturing process, which uses a powder bed fusion technique to melt or sinter precious metal-based powder onto the electrode base with a laser or electron beam, and then to allow the melted or sintered powder to solidify to become the laser deposition layers of the electrode tip, the plurality of laser deposition layers have an average layer thickness T that is between 5 µm and 60 µm, inclusive, and a total thickness of the plurality of laser deposition layers is an electrode tip height H that is between 0.05 mm and 3.0 mm, inclusive.

8. The spark plug electrode of claim 1, wherein the electrode tip includes a precious metal-based material that has at least one precious metal selected from the group consisting of: iridium, platinum, ruthenium, palladium or rhodium.

9. The spark plug electrode of claim 8, wherein the precious metal-based material is either a platinum-based material, a ruthenium-based material, or an iridium-based material that includes no more than 60 wt % iridium.

10. The spark plug electrode of claim 9, wherein the electrode base includes a nickel-based material, the heat dissipating core includes a copper-based material, and the thermal coupling zone includes nickel from the nickel-based material, copper from the copper-based material and precious metal from the precious metal-based material.

11. The spark plug electrode of claim 1, wherein the thermal coupling zone creates a thermal conduit from the electrode tip to the heat dissipating core that is in an interior of the spark plug electrode such that the thermal coupling zone is not exposed on an exterior surface of the spark plug electrode.

12. The spark plug electrode of claim 11, wherein the thermal coupling zone, in the location between the electrode tip and the heat dissipating core, has a higher average thermal conductivity than the electrode base.

13. The spark plug electrode of claim 11, wherein the thermal coupling zone includes a thermal coupling zone alloy with copper from the heat dissipating core, nickel from the electrode base, and at least one of iridium, ruthenium, or platinum from the electrode tip.

14. The spark plug electrode of claim 1, wherein the thermal coupling zone includes a first portion that is located adjacent to the heat dissipating core and a second portion that is located adjacent to the electrode tip, the first portion includes a thermal coupling zone alloy having 2-45 wt % of a precious metal from the electrode tip, and the second portion includes a thermal coupling zone alloy having 2-45 wt % of copper from the heat dissipating core.

15. The spark plug electrode of claim 14, wherein a proportion of the precious metal in the thermal coupling zone alloy decreases along a center axis from the second portion to the first portion, and a proportion of the copper in the thermal coupling zone alloy decreases along the center axis from the first portion to the second portion to create a composition gradient structure.

16. The spark plug electrode of claim 1, wherein the thermal coupling zone includes a first portion that is located adjacent to the heat dissipating core and a second portion that is located adjacent to the electrode tip, the first portion has a bulbous shape and absorbs an axial end of the heat dissipating core, the second portion has a wide and shallow shape and fills in an area underneath the electrode tip.

17. The spark plug electrode of claim 1, wherein the electrode tip is built on a severed end of an electrode body that has an exposed surface of the heat dissipating core so that a truncated axial end of the heat dissipating core is absorbed into the thermal coupling zone.

18. A spark plug electrode, comprising:
an electrode base including a nickel-based material;
a heat dissipating core including a copper-based material, the heat dissipating core is at least partially surrounded by the electrode base;
an electrode tip including a precious metal-based material, the electrode tip is formed on the electrode base with an additive manufacturing process and includes a plurality of laser deposition layers that are perpendicular to a center axis of the spark plug electrode; and
a thermal coupling zone that is at least partially located between the electrode tip and the heat dissipating core, the thermal coupling zone creates a thermal conduit from the electrode tip to the heat dissipating core that is in an interior of the spark plug electrode such that the thermal coupling zone is not exposed on an exterior surface of the spark plug electrode, and the thermal coupling zone includes nickel from the nickel-based material, copper from the copper-based material and precious metal from the precious metal-based material, wherein the thermal coupling zone directly thermally couples the electrode tip to the heat dissipating core.

* * * * *